(12) United States Patent
Christ

(10) Patent No.: US 8,375,819 B2
(45) Date of Patent: Feb. 19, 2013

(54) TOOTHED PIECE FOR A GEARED MOTOR, SERIES OF GEARED MOTORS AND CONNECTION

(75) Inventor: Michael Christ, Karlsdorf/Neuthard (DE)

(73) Assignee: Sew-Eurodrive GmbH & Co, Bruchsal (DE)

( * ) Notice: Subject to any disclaimer, the term of this patent is extended or adjusted under 35 U.S.C. 154(b) by 2354 days.

(21) Appl. No.: 10/470,684

(22) PCT Filed: Jan. 12, 2002

(86) PCT No.: PCT/EP02/00244
§ 371 (c)(1),
(2), (4) Date: Jul. 29, 2003

(87) PCT Pub. No.: WO02/063747
PCT Pub. Date: Aug. 15, 2002

(65) Prior Publication Data
US 2004/0060380 A1    Apr. 1, 2004

(30) Foreign Application Priority Data

Feb. 8, 2001 (DE) .................................. 101 05 745
Mar. 13, 2001 (DE) .................................. 101 11 900

(51) Int. Cl.
  F16D 9/06    (2006.01)
  F16H 55/08   (2006.01)
  F16H 57/02   (2006.01)
  H02K 7/116   (2006.01)

(52) U.S. Cl. .................................... 74/421 A; 74/412 R

(58) Field of Classification Search .................. 74/412 R, 74/413, 414, 420, 421 A, 421 R, 424.5, 451; 403/359.1, 359.2, 359.4, 136
See application file for complete search history.

(56) References Cited

U.S. PATENT DOCUMENTS

| 2,067,477 A | | 1/1937 | Cooper |
| 2,320,379 A | * | 6/1943 | Niekamp .................. 74/421 A |
| 2,650,484 A | * | 9/1953 | Bujak ........................... 464/158 |
| 3,242,998 A | | 3/1966 | Gubbins |
| RE27,126 E | * | 5/1971 | Gingery ..................... 192/70.13 |
| 3,739,652 A | * | 6/1973 | Caldwell et al. ............ 74/421 A |
| 3,757,608 A | | 9/1973 | Willner |
| 4,147,071 A | * | 4/1979 | Scribner et al. ................. 74/409 |
| 4,422,531 A | * | 12/1983 | Ohtomi et al. ................ 254/362 |
| 5,366,422 A | * | 11/1994 | Dye et al. ...................... 475/249 |

(Continued)

FOREIGN PATENT DOCUMENTS

| DE | 26 07 363 | 12/1976 |
| DE | 30 18 986 | 11/1981 |
| DE | 3018986 A1 * | 11/1981 |

(Continued)

OTHER PUBLICATIONS

European Office Action, dated Apr. 10, 2012, issued in corresponding European Patent Application No. 02718020.7.

*Primary Examiner* — Justin Krause
(74) *Attorney, Agent, or Firm* — Kenyon & Kenyon LLP

(57) ABSTRACT

In a toothed piece for a geared motor, series of geared motors and connection, the toothed piece, for a connection with a motor shaft of the electric motor, having at least a first toothing in a first axial region, and having at least a second toothing in a second axial region, the second toothing meshing with a running toothing of a further toothed piece of the gear unit.

11 Claims, 8 Drawing Sheets

U.S. PATENT DOCUMENTS

| | | | |
|---|---|---|---|
| 5,463,914 A * | 11/1995 | Tyan | 74/661 |
| 5,588,328 A * | 12/1996 | Nihei et al. | 74/409 |
| 5,865,239 A | 2/1999 | Carr | |
| 6,029,532 A * | 2/2000 | Phillips | 74/421 R |
| 6,446,523 B1 * | 9/2002 | Ota et al. | 74/432 |

FOREIGN PATENT DOCUMENTS

| | | |
|---|---|---|
| DE | 296 03 748 | 9/1996 |
| EP | 0 989 316 | 3/2000 |
| GB | 888 509 | 1/1962 |

* cited by examiner

TOOTHED PIECE FOR A GEARED MOTOR, SERIES OF GEARED MOTORS AND CONNECTION

FIELD OF THE INVENTION

The present invention relates to a toothed piece for a geared motor, a series of geared motors and a connection.

BACKGROUND INFORMATION

U.S. Pat. No. 3,242,998 describes a toothed piece, driven by a toothed motor shaft, for a connection to an output shaft, which has a first toothing in a first region and a second toothing in a second region. In this case, an internal toothing must be produced in a complicated and expensive manner.

A shank pinion is also described as a toothed piece in European Published Patent Application No. 0 989 316. However, during mounting, centering may only be provided in a costly manner.

In German Patent Published Patent Application No. 26 07 363, the toothed piece has two helical toothings. However, centering during mounting is again costly.

German Published Patent Application No. 296 03 748 describes a pin for an adapter, the pin being usable for centering upon insertion.

Geared motors are conventional whose motor shaft drives an externally-toothed pinion, whose toothing meshes with an externally-toothed gear wheel having a running toothing or running gear.

To reduce noise, involute toothings having a non-vanishing helix angle are used for these toothings. A disadvantage in this case is that, during the transmission of torque, axial forces develop which must be absorbed by further components such as bearings.

Therefore, it is an object of the present invention to provide a pinion for a geared motor in such a manner that less expensive parts may be used in the gear unit or, in a more cost-effective manner, parts may even be omitted in the gear unit.

SUMMARY

According to an example embodiment of the present invention, the foregoing and other beneficial objects may be achieved by providing a toothed piece for a geared motor according to the features described herein, and by providing a connection according to the features described herein.

Features of the present invention with respect to the toothed piece include that, for a connection to a motor shaft of the electric motor, the toothed piece has at least a first toothing in a first axial region, and at least a second toothing in a second axial region, the second toothing meshing with a running toothing of a further toothed piece of the gear unit. In this context, it may be provided that the second toothing may be implemented with a different pitch circle diameter than the first toothing. Therefore, on the motor side, different toothed pieces are useable within one size for different variants. The toothed pieces are able to be implemented with always the same first toothing on the motor side, and with different second toothings on the gear unit side. In this manner, a motor shaft of the same kind may be used within the size for each variant, it being possible to realize different transmission ratios at the first input stage of the gear unit. Another aspect is that a high torque may be able to be transmitted from the motor shaft to the toothed piece with the aid of the first toothing.

In an example embodiment of the present invention, the motor shaft has a driver toothing which meshes with the first toothing of the toothed piece. Not only is a high torque transmittable, but the toothings may also be produced inexpensively using industrially common toothing machines.

In an example embodiment of the present invention, the first and second toothings are each helical toothed and have the same algebraic sign for the helix angle and/or have the same helix angle. This may provide that the components of axial force, generated by the helical toothings, onto the toothed piece itself may be influenced in the design by the selection of the helix angles and the toothing data so that a reduced, resulting component of axial force onto the toothed piece itself is attainable. Improvements in the design of the gear unit may be achieved by this reduction in the resulting axial force onto the toothed piece itself. Other parts may be implemented more cost-effectively or even dispensed with, such as suitable retaining rings, etc.

In an example embodiment of the present invention, the first and second toothings are involute toothings. Such industrially common toothings may be produced inexpensively, easily and quickly on suitable production machinery.

In an example embodiment of the present invention, the first and/or second toothing is/are external toothings. The toothed piece has may have a compact form and therefore may be produced inexpensively. External toothings may be manufactured simply, quickly and inexpensively using large milling cutters, and after the hardening, using large grinding wheels.

In an example embodiment of the present invention, the pitch circle diameter of the first toothing is larger than the pitch circle diameter of the second toothing. A smaller gear wheel may also be used in the first gear stage, including second toothing of the shank pinion and gear wheel, which means it may also be possible to realize small transmission ratios.

In an example embodiment of the present invention, the toothed piece has, at its motor-side end, a pin or plug which is inserted in such a manner into a corresponding cut-out in the motor shaft that, upon insertion into the cut-out, it may be used for centering the toothed piece. This may provide easy and quick production. In particular, the centering may also permit a highly precise, and at the same time, quickly executable assembly.

In an example embodiment of the present invention, the pin may be cylindrical. The pin may be produced inexpensively.

In an example embodiment of the present invention, the pin may be conical. This may provide that assembly may be accomplished particularly quickly, and even if the toothed piece deviates from the ideal position prior to or during assembly, a centering may take place automatically correctly upon insertion into the motor shaft.

In an example embodiment of the present invention, the pin may have a knurling. The knurling may have a greater hardness than the material of the motor shaft, and therefore may be able to be pressed into the motor shaft, accompanied by material deformation. Therefore, in the case of small torques, the connection of the toothed piece to the motor shaft is implemented via this press connection. Only after a critical torque is exceeded is the driver toothing of the motor shaft usable with the first toothing of the toothed piece for the torque transmission.

In an example embodiment of the present invention, the toothed piece may have a cut-out which, upon introduction into the motor shaft, is useable for centering the toothed piece. The toothed piece may have only a short length, and therefore may need less storage space and assembly space. In particular, it may be rotatable on a smaller space volume during the assembly. It also may have less volume of material. Because of the higher torque to be transmitted and the greater hardness for the machine grinding of the toothings, the material of the toothed piece may be more expensive than the material for the motor shaft, for which structural steel may also be used.

In an example embodiment of the present invention, the first and second toothings may be included by a single toothing. This may provide that production may be particularly simple, and a high transmission ratio may be realized.

In an example embodiment of the present invention, the driver toothing of the motor shaft may be an inner toothing. This may provide that it may be produced inexpensively using industrially common production methods, e.g., by striking, broaching, original forming and/or milling, etc.

Features of the present invention with respect to the series of geared motors are that the series includes at least one size, and each size includes one or more variants of geared motors. Within one size, substantially identical motor shafts, which in each case are connectible and/or connected to a toothed piece, are usable for different variants. Within one size, at least one variant includes a toothed piece whose first and second toothings are different. At least one further variant includes a toothed piece whose first and second toothings are identical. In this context, it may be provided that, by the use of different toothed pieces, it may be possible to realize a wide range of different transmission ratios. In particular, not only the toothing data may be varied, accompanied by an essentially constant pitch circle diameter, but also the pitch circle diameters may be varied within one size for the variants. This may enlarge the range of transmission ratios considerably.

In addition, it is possible to use an involute toothing as a first toothing, and as a second toothing, to use a pinion for a helical-bevel gear stage, or a pinion for another type of gear stage such as, for example, a planetary gear stage, a gear stage having a spiroidally toothed wheel or other bevel gear stages. Therefore, even a motor shaft which is always substantially identical may be used for various types of the input gear stage.

Features of the present invention with respect to the connection from a first rotating part via a toothed piece to a part having a running toothing are that the toothed piece has a second toothing which meshes with the running toothing. The toothed piece has a first toothing which meshes with a driver toothing of the first rotating part. The helix angles of the first and the second toothing are selected so that the direction of the axial force, generated by the driver toothing and first toothing, onto the toothed piece itself, and the direction of the axial force, generated by the running toothing and second toothing, onto the toothed piece itself are opposite, in order to decrease the resulting axial force onto the toothed piece itself. This may provide that the components of axial force, generated by the helical toothings, onto the toothed piece itself may be influenced in the design by the selection of the helix angles and the toothing data so that a reduced, resulting component of axial force onto the toothed piece itself is attainable. Improvements in the arrangement of the total device may be achieved by this reduction in the resulting axial force onto the toothed piece itself. Other parts may be implemented more cost-effectively or even dispensed with, such as suitable retaining rings, etc.

Further example embodiments and developments are set forth below.

The present invention shall now be explained in detail with reference to the accompanying Figures.

DETAILED DESCRIPTION

Figure 1:
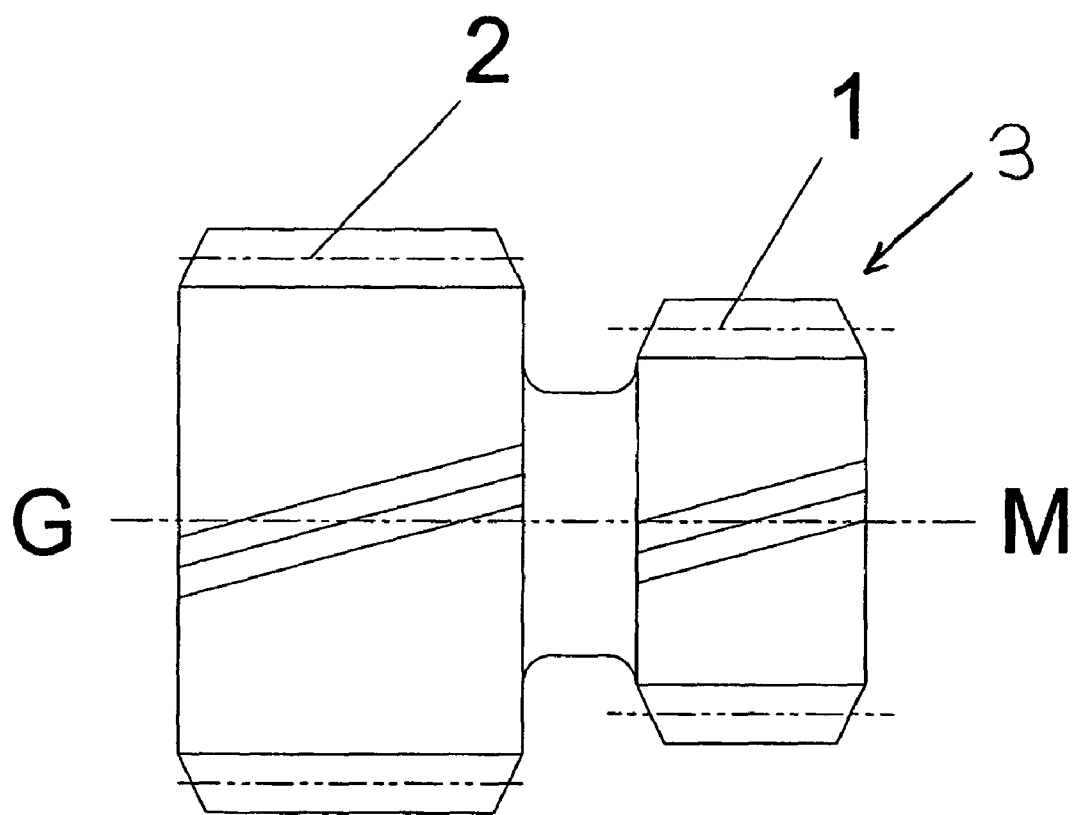
FIG. 1 is a schematic view of an example embodiment of a toothed piece according to the present invention.

FIG. 1 shows a shank pinion 3 which has a first toothing 1 and a second toothing 2, first toothing 1 having a smaller pitch circle diameter than second toothing 2. First toothing 1 and second toothing 2 each have a negative helix angle of the same amount. In other exemplary embodiments of the present invention, different amounts may also be used.

Figure 2:
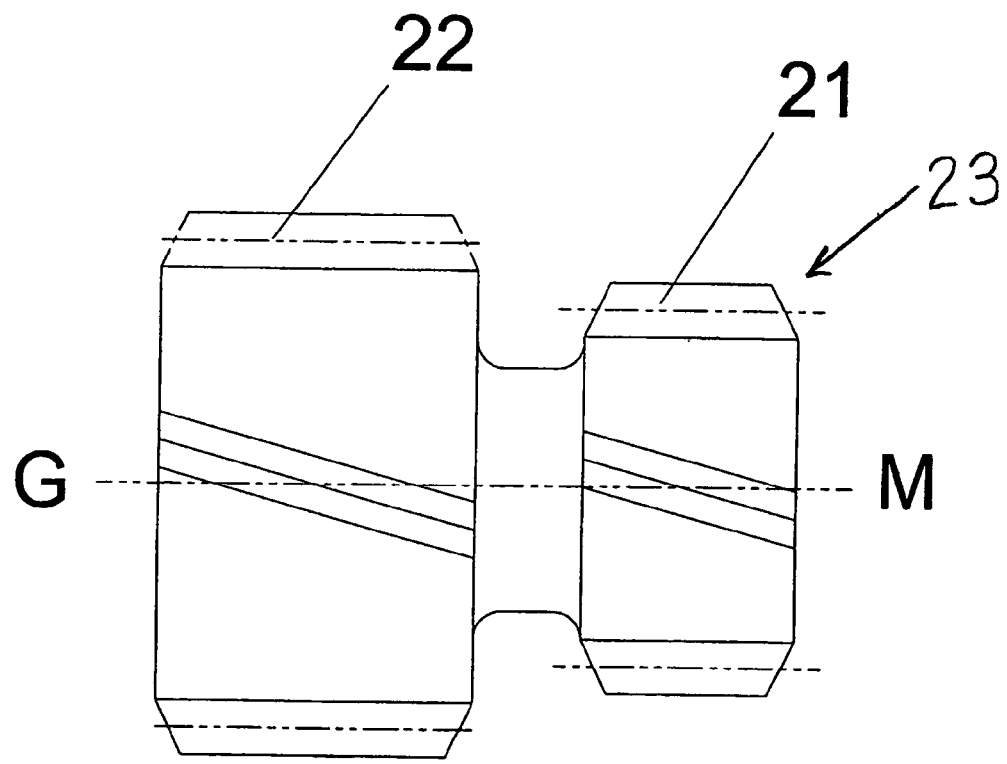
FIG. 2 is a schematic view of an example embodiment of a toothed piece according to the present invention.

FIG. 2 shows a shank pinion 23 which has a first toothing 21 and a second toothing 22, first toothing 21 again having a smaller pitch circle diameter than second toothing 22. First toothing 21 and second toothing 22 each have a positive helix angle of the same amount.

The helix angle is denoted symbolically in FIGS. 1 and 2 by three parallel marks. In the figures, M designates the motor-side axial end of the shank pinion, and G designates the axial end of the shank pinion on the gear unit side.

Figure 3:
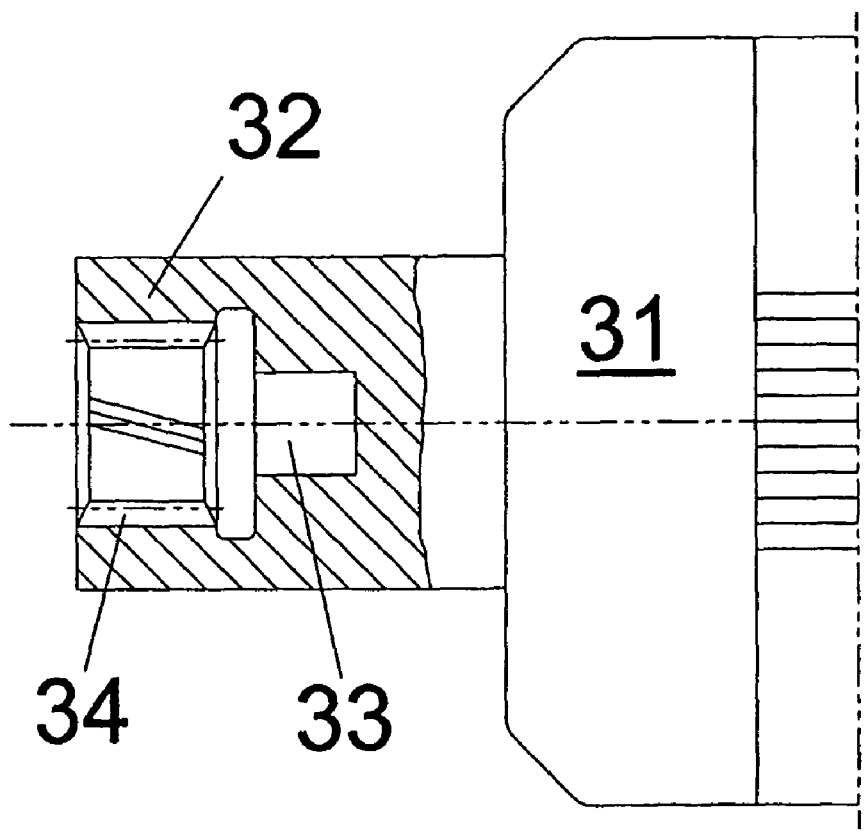
FIG. 3 is a schematic partial cross-sectional view of a motor adapted to mesh with the toothing of the toothed piece.

In FIG. 3, a motor 31 is partially indicated, whose motor shaft 32 has a bore hole having a driver toothing 34, implemented as an inner toothing, with which first toothing 1, 21 of shank pinion 3, 23 meshes.

In addition, the motor shaft has a cut-out 33 for centering a shank pinion provided with a corresponding pin. In other exemplary embodiments of the present invention, motor shaft 32 may be implemented without a cut-out, shank pinions 3, 23 according to FIG. 1 or 2 then being used.

Figure 4:
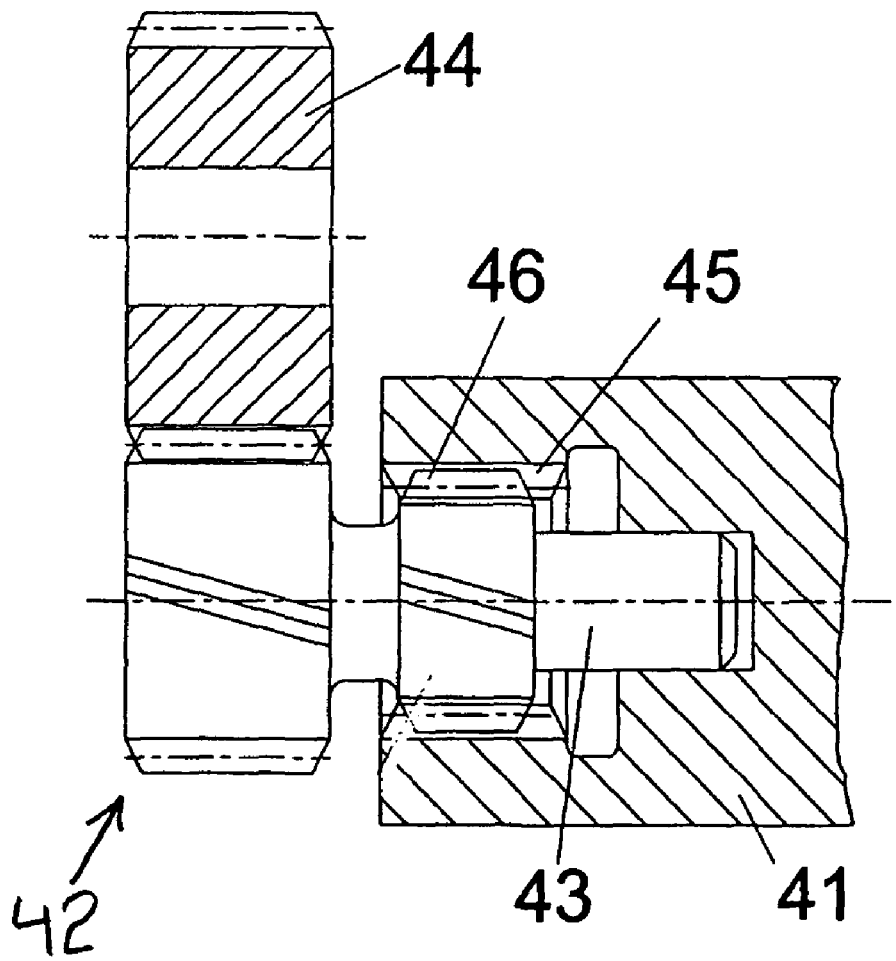
FIG. 4 is a partial cross-sectional view illustrating an example embodiment of the present invention.

FIG. 4 shows a shank pinion 42 which has a cylindrical pin 43 for centering upon insertion into motor shaft 41. With second toothing 2 as running toothing, shank pinion 42 meshes with gear wheel 44 of the gear unit.

Driver toothing 45, arranged as a helical toothing and meshing with first toothing 46 arranged as a helical toothing, generates a component of axial force onto the toothed piece. The running toothing of gear wheel 44, together with the second toothing of shank pinion 42, generates an oppositely directed component of axial force onto the toothed piece itself. Therefore, the resulting component of axial force onto the toothed piece itself has only a small or even vanishing value, depending upon the selection of the helix angles and the toothing data.

Figure 5:
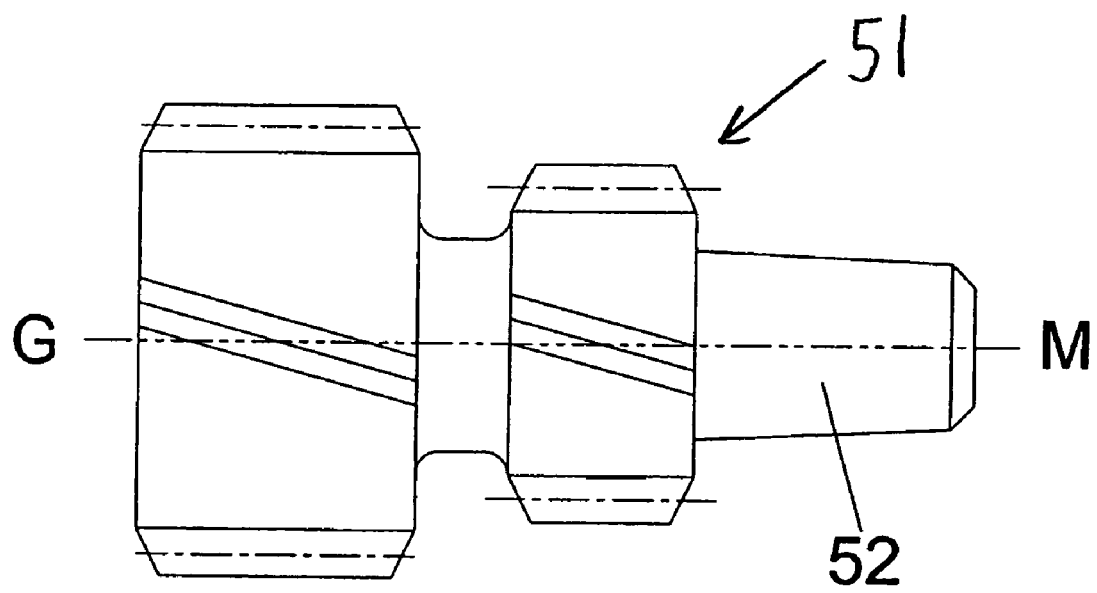
FIG. 5 is a schematic view of an example embodiment of a toothed piece according to the present invention.

FIG. 5 shows a shank pinion 51 having a conical pin 52 for the centering in a correspondingly conical cut-out and/or bore hole in the motor shaft.

Figure 6:
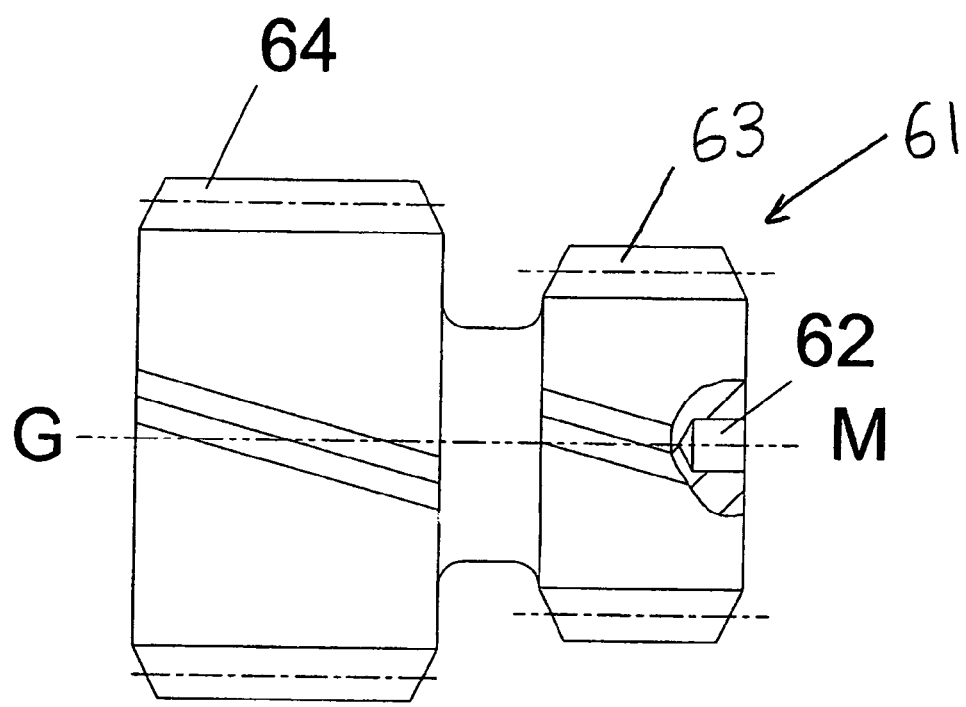
FIG. 6 is a schematic view of an example embodiment of a toothed piece according to the present invention.

FIG. 6 shows a shank pinion 61 which has a first toothing 63 and a second toothing 64. In addition, shank pinion 61 has a cut-out 62 for the centering, the motor shaft having a corresponding form or, in other exemplary embodiments of the present invention, the motor shaft being provided with corresponding parts.

Figure 7:
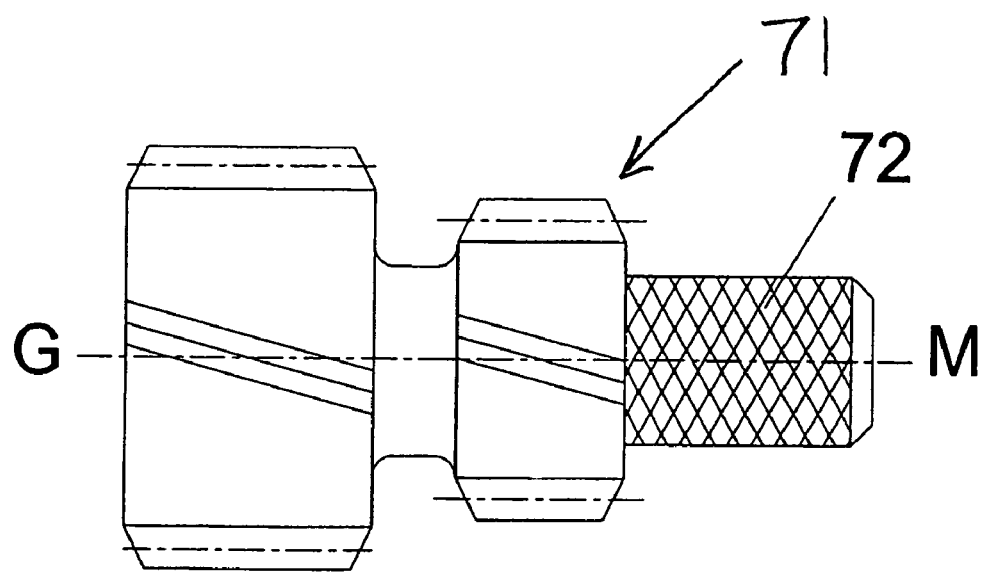
FIG. 7 is a schematic view of an example embodiment of a toothed piece according to the present invention.

FIG. 7 shows a shank pinion 71 having a pin provided with a knurling 72. Since shank pinion 71 is made of a hardened material and/or a material having a greater hardness, shank pinion 71 is able to be pressed into the softer motor shaft, made of structural steel, accompanied by material deformation.

Instead of structural steel, other materials may also be used which are less hard than the shank pinion.

Figure 8:
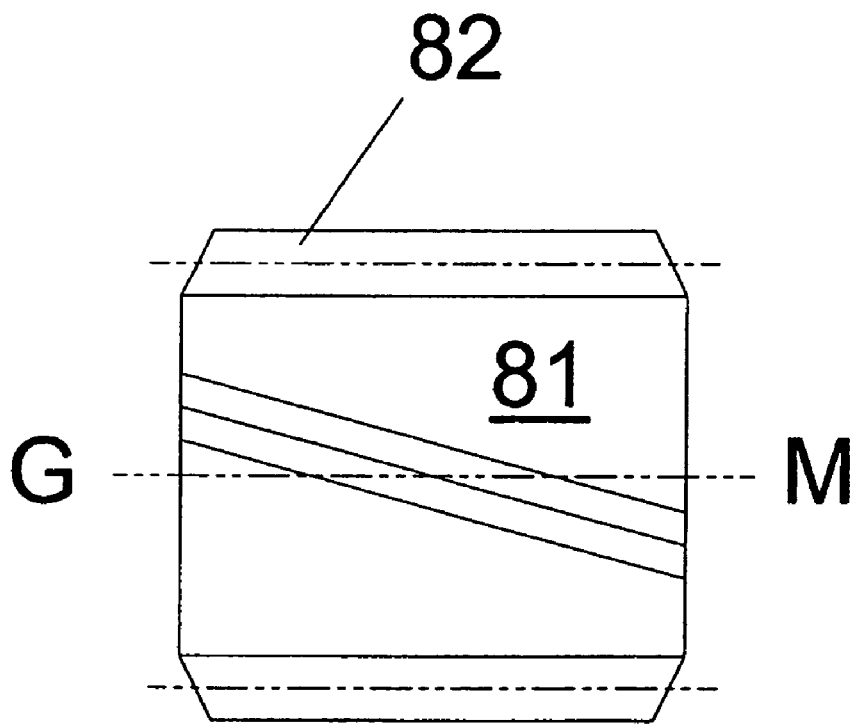
FIG. 8 is a schematic view of an example embodiment of a toothed piece according to the present invention.

FIG. 8 shows an example embodiment of the present invention, shank pinion 81 having a helical-toothed toothing 82 which, on the motor side, meshes with the correspondingly helical-toothed driver toothing of the cut-out of the motor shaft, and on the gear unit side, meshes with the running toothing of a correspondingly helical-toothed gear wheel of the gear unit. Therefore, it may only be necessary to produce a single toothing, which may be particularly simple and cost-effective.

Thus, shank pinions according to FIG. 8, for which toothing data such as, e.g., root diameter, outside diameter and pitch circle diameter of the first and of the second toothing are identical, may be used in a series of gear units having several gear ratios within one size. In addition, shank pinions according to FIG. 1 are usable with the same motor shaft. Since, therefore, different shank pinions having, in each case, a different second toothing but identical first toothing may be used, it is possible to realize a wide range of transmission ratios.

In further example embodiments of the present invention, the foregoing may also be used for other types of toothing. For example, the first toothing of the shank pinion is a helical-toothed involute toothing, and the second toothing meshes with a bevel gear or a spiroidally toothed wheel. Thus, cylindrical or non-cylindrical second toothings are also possible.

In other example embodiments of the present invention, the foregoing may be used not only for gear units, but also for other devices which include a connection from a first rotating part, such as a shaft, via a toothed piece to a part having a running toothing. In this context, in the manner shown in the Figures, the toothed piece may be arranged with a first and second toothing, each having the same algebraic sign of the helix angle, such that the axial force components generated in each instance act in the opposite direction. Therefore, the aspects and effects indicated above may also be achieved for other devices.

What is claimed is:

1. A toothed piece of a geared motor, including an electric motor and a gear unit, comprising:
    a first toothing arranged in a first axial region adapted for connection to a motor shaft of the electric motor;
    a second toothing arranged in a second axial region adapted to mesh with a running toothing of a further toothed piece of the gear unit; and
    a pin arranged at a motor-side end of the toothed piece, the pin configured to be inserted into a corresponding cut-out of the motor shaft to center the toothed piece;
    wherein the motor shaft includes a bore hole with an interior having a driver toothing, the first toothing meshing with the driver toothing.

2. The toothed piece according to claim 1, wherein the first axial region is arranged on a motor side and the second axial region is arranged on a gear unit side.

3. The toothed piece according to claim 2, wherein the first axial region is arranged at a motor-side end of the toothed piece.

4. The toothed piece according to claim 2, wherein the second axial region is arranged at an end of the toothed piece on the gear unit side.

5. The toothed piece according to claim 2, wherein the toothed piece is configured as a shank pinion.

6. The toothed piece according to claim 2, wherein each of the first toothing and the second toothing include helical toothings having at least one of a same algebraic sign for a helix angle and a same helix angle.

7. The toothed piece according to claim 2, wherein the first toothing and the second toothing include involute toothings.

8. The toothed piece according to claim 2, wherein at least one of the first toothing and the second toothing includes an external toothing.

9. The toothed piece according to claim 2, wherein a pitch circle diameter of the first toothing is smaller than a pitch circle diameter of the second toothing.

10. The toothed piece according to claim 1, wherein the pin is cylindrical.

11. A connection from a first rotating part to a piece having a running toothing, comprising:
    a toothed piece including a second toothing meshed with the running toothing and a first toothing meshed with a driving toothing of the first rotating part, the first rotating part having a bore hole, the driving toothing internal to the bore hole, the first toothing meshing with the driving toothing, the toothed piece including a pin inserted into a corresponding cut-out of the first rotating part to center the toothed piece;
    wherein helix angles of the first toothing and the second toothing are arranged so that a direction of a helix force generated by the driver toothing and the first toothing and a direction of an axial force generated by the running toothing and the second toothing are opposite to reduce the resulting axial force.

* * * * *

UNITED STATES PATENT AND TRADEMARK OFFICE
CERTIFICATE OF CORRECTION

PATENT NO. : 8,375,819 B2  Page 1 of 1
APPLICATION NO. : 10/470684
DATED : February 19, 2013
INVENTOR(S) : Michael Christ It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2761 days.

Signed and Sealed this

First Day of September, 2015

Michelle K. Lee
*Director of the United States Patent and Trademark Office*